INVENTORS.
WOLFGANG GRASSMANN
KURT HANNIG

ATTORNEY

INVENTORS.
WOLFGANG GRASSMANN
KURT HANNIG

ATTORNEY

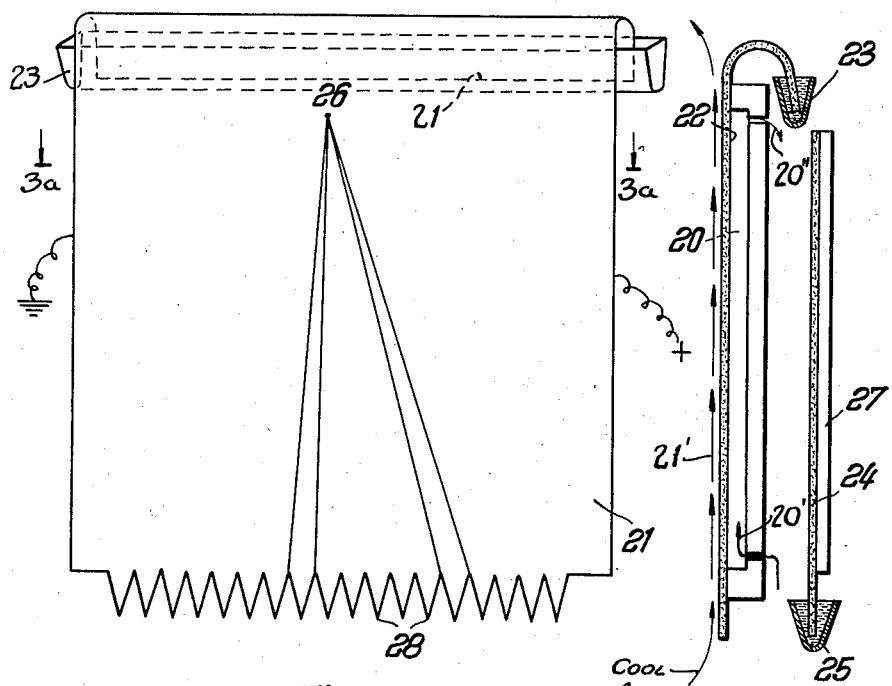

United States Patent Office 2,888,392
Patented May 26, 1959

2,888,392
METHOD AND APPARATUS FOR ELECTROPHORETIC SEPARATION OF MIXTURES OF SUBSTANCES

Wolfgang Grassmann and Kurt Hannig, Regensburg, Germany

Application November 29, 1956, Serial No. 625,149

Claims priority, application Germany December 2, 1955

13 Claims. (Cl. 204—180)

The present invention is directed to the electrophoretic separation of the individual constituents of a mixture thereof in solution and more particularly it is directed to the provision of an improved method and to an apparatus for practicing the method.

It is known how to separate and analyze mixtures of materials, for example from dyes, amino-acids, sugars, tannic acids, hormones, ferments and other effective substances, in a procedure whereby use is made of their diverse migration velocity and in some cases, migration direction in the electric field within a porous medium impregnated with an electrolytic or buffer solution, for example filter paper.

Heretofore substantially the following two arrangements have been known for electrophoresis in porous carrier media:

(a) A discontinuous working arrangement, particularly in strips of porous material, wherein the substances to be separated are placed in position and an electric field is set up, wherein the components migrating in the same direction with the lines of force or in opposite directions are separated on the basis of their different migration velocities.

(b) A continuously working arrangement, in which the mixture of materials to be separated is allowed to flow in at one point into a carrying liquid medium that moves in an oblique or vertical direction to the direction of the electric field, through a porous carrier medium, wherein the individual components of the mixture according to the direction and velocity of their electrophoretic migration can be deflected or turned off from the direction of flow of the carrying liquid and removed at various points in the arrangement.

Good results are produced by the carrying out of the electrophoresis in porous carrier media only if the evaporation of liquid from the carrier medium called for by the joulean heat is obviated or kept slight.

In the so-called low-voltage electrophoresis (up to field intensities of 5–10 volts/cm.) the evolution of heat when use is made of carrier media of laminar design, for example filter paper, thin filter paper, cardboard and the like, occasioned by joulean heat, is only slight and the vaporization of liquid is merely so slight that no special precautionary measures need be taken for the exhausting of the heat and for the avoidance of vaporization. This changes, however, if for the purpose of increasing the flow laminar carrier media of more considerable thickness is used, or if for the purpose of increasing the sharpness of separation and the rate of flow and for the purpose of shortening the periods of separation, high field intensities are applied, such as is the case with the so-called high tension electrophoresis with field intensities up to 100 volts/cm. In view of the fact that under otherwise equal conditions the joulean heat formed per unit of time rises with the square of the voltage and the necessity of eliminating relatively considerable quantities of heat arises. If this is not done there occurs an extensive and possibly complete desiccation of the porous material, a crystallization of the buffer salts and finally a standstill in the electrophoretic migration. In the case of high tension electrophoresis and use of filter paper, even a scorching of the strip may come about. An intense vaporization can possibly occur even in slight field intensities if, for example, operations are being performed at high temperatures.

A number of proposals have been made aiming at the avoidance of this deficiency. In the discontinuous arrangement, there is the possibility that the strip for the replacement of the vaporizing liquid may reabsorb liquid from the electrode containers, in which case the content of liquid of the strip is maintained at least in its parts located close to the electrode containers, but in the strip or in the porous material eddy currents occur and superpose themselves upon the electrophoretic migration (wick effect) as well as changes difficult to control in the electrolytic concentration inside the strip. For this reason in the processes heretofore known the vaporization of liquid by joulean heat from the porous material, particularly filter paper strip, has been avoided or altered in a procedure whereby the laminar structures made of porous material, for example filter paper strip, impregnated with electrolytic or buffer solution and charged with a mixture of materials, would be inserted in a cooled bath of a neutral organic solvent not miscible with water, such for example as toluene or chlorbenzene, so that the impregnated strips would be surrounded by this solvent on all sides. Or the joulean heat would be eliminated in a procedure whereby the strips would be placed upon one cooled isolated plate or between two cooled isolated plates, so that they had close contact with the cooled surface on one or two sides of the paper surface.

However, there are considerable shortcomings inherent in the process described. When use is made of a cooling bath from organic neutral liquids the impregnated paper strip, and accordingly the mixture of material to be separated, are in direct contact with the organic solvent, which for example in the case of proteins leads to denaturing of surface and as a result to indefinite and irregular separations and in practically all cases to losses of substance through partial diffusion into the organic solvent of the individual components of the mixture of material that are to be separated. When use is made of cooled surfaces for the elimination of the joulean heat surface, conditions are had on the contact surface of the porous material with the cooled surface that are conditions of migration different from those obtaining on the inside of the porous material and this effect becomes particularly great if—which is hardly to be obviated—the contact of the porous material with the cooling surfaces is not entirely even.

Furthermore and more specifically in high tension electrophoresis the top surface of the cooling plates must possess a high electric insulating value and high electric rupturing value, properties that as is known are never combined with commensurately higher heat conductivity. Furthermore there practically always takes place on the cooling surfaces an irregular condensation of liquid from the electrophoresis strip, which leads to formation of drops and finally to an uneven wetting through of the porous material (electrophoresis strip). However, as a result of this the separation becomes poor, irregular and faded. A further objectionable feature of this process presents itself as a result of the fact that at the places where the cooled surfaces come in direct contact with the mixture of substance there is an occurrence of losses of substance because of adherence to the cooling surfaces. Heretofore in all cases it has not been possible to carry out quantitative severances.

The present invention is intended and adapted to overcome the difficulties and disadvantages inherent in prior methods for electrophoretic separation, it being among the objects of the invention to provide a process which will eliminate the unfavorable results of the joulean effect in the separation by either a continuous or a batch operation.

It is also among the objects of the present invention to provide an apparatus for conducting the present process which is simple in construction, efficient in design and which may be readily operated by ordinary plant workmen.

The drawbacks of the prior art can be avoided according to the invention by a procedure in which for the improvement of electrophosphoretic processes of separation in which the mixture of substance to be separated is placed upon a porous carrier impregnated with electrolytic solution the carrier is cooled by means of a gaseous cooling medium and/or by an increase in its heat radiation and the liquid vaporizing from the carrier is replaced by a supply of liquid in mist or vapor form. Preferably the laminar porous carrier material (paper or cardboard from cellulose fibers, glass fibers or synthetic fibers, webs, plates of starch, clay, sintered glass powder, sintered corundum powder, etc.), fashioned in the form of foils or plates, is arranged, sustained only on the edges thereof and surrounded on both sides only by a gas atmosphere, wherein the joulean heat is eliminated on one of the sides of the porous carrier material by convection and radiation and if need be in the form of vaporization heat, while at the same time on the other side liquid is condensed upon it to a degree in keeping with the subsequent evaporation.

In the discontinuous execution of the electrophoresis, in particular in the high tension electrophoresis, in which mostly horizontally arranged porous carriers of laminar design are used, the manner in which the process is carried out according to the invention is for example as follows:

The porous material impregnated with electrolytic solution is arranged horizontally or vertically as close as possible to a cooled surface, for example the surface of a cooling brine kept at constant temperature. When this is done the uniform distance between cooling brine surface and the suspended porous material is achieved, for example, in a procedure whereby the strip stretched so as to be as taut and horizontal as possible is sustained at intervals for example of 5–10 cm. by fibers, for example of nylon or perlon that are unspun, smooth and stretched upon a frame, so that the strips made of porous material do not sag and receive a support by the fibers only on a few lines. The fibers must be of water-repellent, non-absorbing and non-conducting material for the prevention of disturbances through wick action. After application of a direct current voltage the occurring joulean heat is then eliminated to a large extent by vaporization, radiation or convection. The heat emission can further be sustained through a procedure in which between the cooling brine and the laminar carrier medium a current of air is blown through.

The replacement of the vaporizing liquid is effected according to the invention preferably on the opposite side of the laminar carrier material, thus in the described example on the upper side, by condensation of liquid upon it. The condensing of liquid upon it can be done by an aerosol of a fine liquid mist or by a procedure in which liquid is vaporized from a further porous plate capable of being heated if necessary and kept uniformly moist by a suitable device, the plate being arranged at a short distance parallel to the actual separating surface of porous material. In order to obviate a reabsorption of liquid in the separating strip from the electrode areas through suction or siphon effects, the contact of current of the ends of the strip with the electrolytic solution located in the electrode areas can be effected, for example, through the medium of a more compact membrane, for example a cellophane bag.

In the continuous execution of the electrophoresis in which mostly vertically arranged porous carriers of laminar design are used, the execution of the process according to the invention goes on for example along the following lines:

The laminar structure of porous material through which a suitable electrolytic solution flows is arranged in suspended manner, advisably vertical, so that the flowing electrolytic solution can at the top flow into and after diffusion of the porous material flow out at bottom. After application of a direct-current voltage in such wise that the electric field is directed obliquely to the direction of flow of the electrolytic solution, the joulean heat is then eliminated, for example, through a procedure in which one side of the laminar structure of porous material has blown uniformly against it a cooled current of air brought to constant temperature and constant moisture content. The replacement of the vaporizing liquid is effected according to the invention on the opposite side of the laminar carrier material through condensation of liquid upon it. The condensation of liquid upon it can be effected by an aerosol of a liquid mist or through a procedure wherein liquid is evaporated from a further porous plate capable of being heated if need be and kept uniformly moist by a suitable device, the plate being arranged at a slight distance parallel to the actual separating surface of porous material.

Through these measures the arrangements of the units of apparatus for the execution of the continuous electrophoresis process become comparatively simple and the transfer to operations on an industrial scale entails no difficulties if the dimensions of the arrangements are commensurately enlarged or if—which is more economical—an arrangement is chosen in which several separating surfaces of porous material are set up in such a manner one behind the other that it is cooled in regular alternation from one side while from the other side liquid is condensed upon it in replacement of the vaporized liquid, as this is diagrammatically shown in Example C.

By choice of the conditions it lies within one's power, in the process according to the invention, to keep the content of moisture in the laminar structure of porous material at a wanted level, to be accurately determined. The vaporization of liquid from the porous material is increased and its content of moisture is reduced by a change in the following factors: Increase in the field intensity and conductivity in the porous material impregnated with electrolytic solution, increase in the escape of heat and vaporization on the cooling side, which on its part is dependent upon temperature, velocity and moisture content of the current of air blown upon it or, in the case of the use of a laminar design of cooling brine container and radiator box, upon the temperature and distance thereof. Conversely the condensation of liquid upon the porous material depends in the main upon the concentration of the aerosol employed or, when liquid is evaporated, upon velocity of evaporation, which in turn is dependent upon temperature and peradventure distance of the moist and heatable plate arranged parallel to the actual separating surface made of porous material.

All changes in the degree of moisture of the porous carrier material in which the electrophoretic separation takes place manifest themselves by a change in the conductivity or in the current, so that they can easily be controlled. In view of the fact that a number of factors can be changed and adjusted to suit a particular purpose, viz. the tension applied, temperature of the cooling brine and/or content of moisture and temperature of the current of air employed for the cooling and quantity of liquid to be condensed during the experiment, the possibility exists of maintaining a complete state of equilibrium between vaporization of liquid from the laminar structures of porous material in which the electrophoretic separation comes about, on the one hand, and on the other a corresponding condensation of liquid on the porous material. The regulation of this state of equilibrium can in such case, if need be, also be brought about by automatic installations.

Such installations for the adjustment and maintenance of a state of equilibrium can be for example: cooling units with thermostat control for attaining and keeping constant a desired temperature of the cooling brine or of the current of air. The adjustment of temperature can in such case be effected in combination with any changes in the conductivity in the porous carrier medium during the electrophoresis and accordingly in the flow of current, positively and automatically to the suitable degree; dosing of the quantity of liquid to be condensed (by aerosol or evaporation), in which case the control can be effected by changes in conductivity in the porous material during the electrophoresis. Furthermore by keeping the flow of current constant through the porous material during the electrophoresis, for example, in such wise that when the conductivity of the porous material is increased the tension is correspondingly lowered, this being computable by corresponding and known equations.

The device for the execution of the process according to the invention comprises an installation for blowing a gaseous cooling medium upon the surface of the porous carrier and/or surface element absorbing heat rays and standing in heat radiation exchange with the carrier, an arrangement for supplying a liquid mist or liquid vapor and an arrangement for generation of this mist or vapor.

In the accompanying drawings constituting a part hereof and in which like reference characters indicate like parts, Fig. 1a is a vertical cross-sectional view of an apparatus adapted to practice the present invention;

Fig. 1b is a transverse cross-sectional view thereof taken along line A—B of Fig. 1a;

Fig. 3a is a horizontal cross-sectional view of another embodiment of the apparatus;

Fig. 3b is a front elevation thereof, some parts being shown diagrammatically;

Fig. 3c is a transverse cross-sectional view thereof, and

The following are specific examples of the practice of the invention:

*Example 1*

Figure 1A:
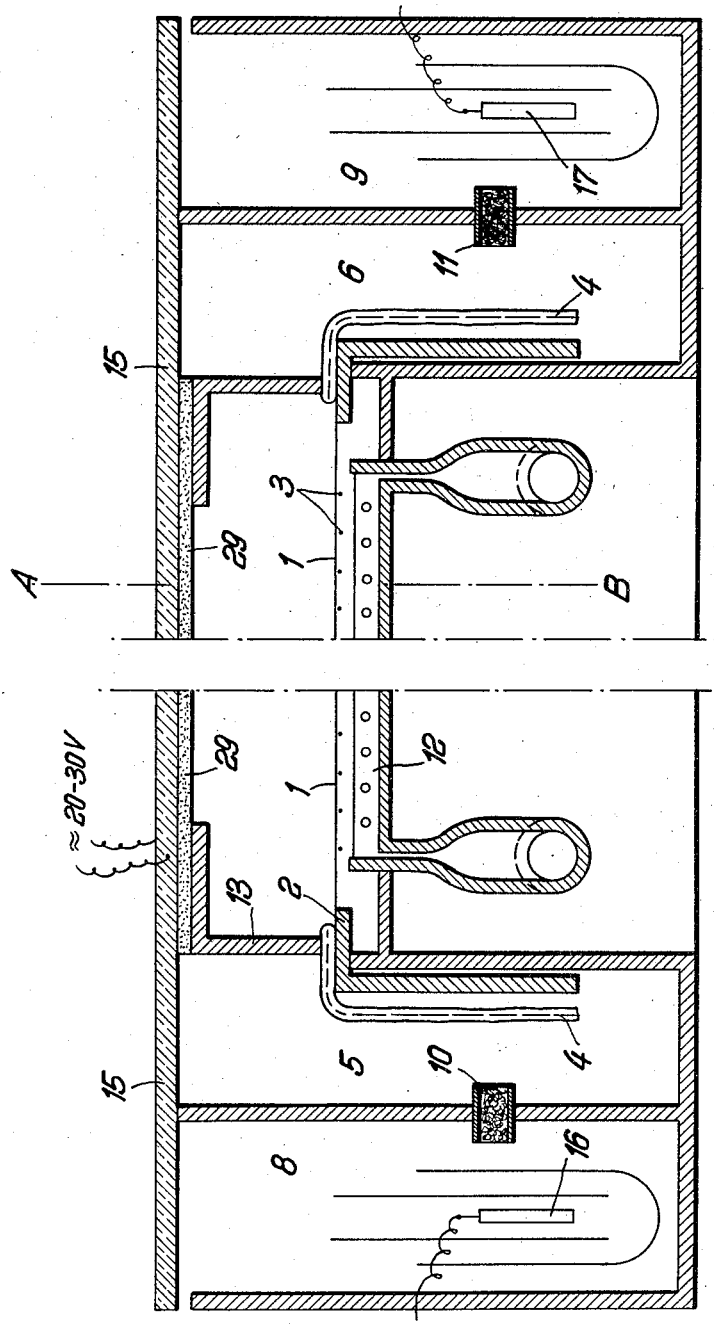
Figure 1B:
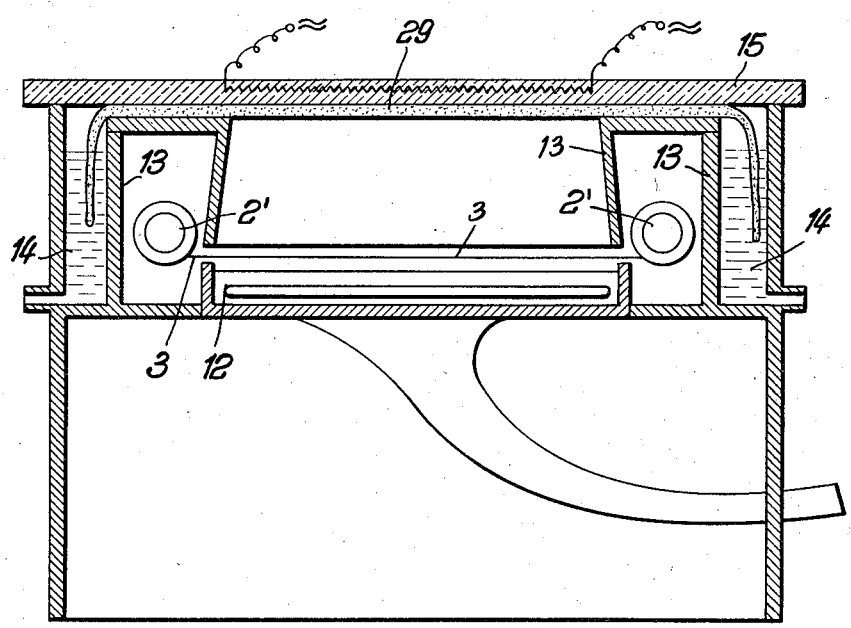
Figure 2:
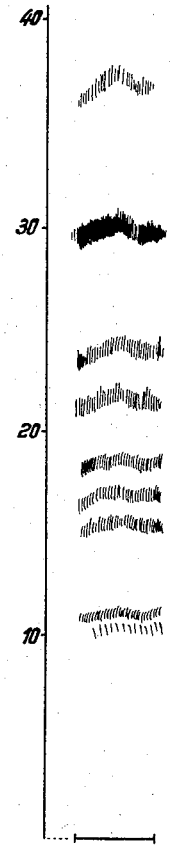
Fig. 2 is a fragmentary diagrammatic view of a filter strip showing the separated components of a treated mixture.

Figs. 1a, 1b and 2 are directed to a discontinuous method of high tension electrophoresis in which the strip is in a horizontal position. 0.05 ccm. of an amino acid mixture consisting of amino acids, viz. glycine, alanine, alpha-amino butyric acid, serine, threonine, methionine, glutamic acid, aspartic acid and oxyproline, is applied in the form of a cross-bar upon a filter paper strip 1 about 10 cm. wide and 60 cm. long steeped with 1 N acetic acid and saturated with the electrolyte 110% of its weight on the anode side.

Strip 1 so prepared is laid out in such a way upon the charging frame 2 that the two ends are located upon crosspiece of the frame and the whole strip is suspended without sagging in as taut a condition as possible in the frame. The sagging of the strip in this arrangement is additionally prevented by support upon the obliquely stretched nylon threads 3, the ends of which are secured to supports 2'. The contact is effected by two filter cloths 4 inserted in dialyzer tubes 5 and 6, the cloths being placed upon both ends of the electrophoresis strip and upon the crosspiece and by means of a pressing device in good contact of current with the ends of the strips. The charging frame so prepared is then brought into the actual chamber of electrophoresis, so that the two filter cloths surrounded by dialyzer tube come into contact in the two areas 5 and 6 containing the buffer solution with the electrolytic or buffer solution that is found therein. For the purpose of precluding pH changes the electrodes 16 and 17 are surrounded in the buffer areas 8 and 9 abutting them by a labyrinth system of glass enclosing these electrodes 16 and 17. The contact between the buffer areas 5 and 8, as well as 6 and 9, is effected by two openings 10 and 11, which are filled with glass wool for the further avoidance of pH changes. The trough-like recess 12 has cooling brine running through it or the cooling brine is found above a cooling plate or cooling coil through which the cooling agent flows in the trough. The distance of the surface to the electrophoresis strip located above it is about uniform 5–6 mm. The temperature of the cooling brine is, for example −5° C.

Over the strip a moist filter cloth 29 is stretched by means of a frame 13, the cloth being capable of reabsorbing the liquid from two supply chambers 14 located on the edge along the chamber. The chamber is then covered up with an electrically heated glass plate 15 and the temperature on the heating plate is adjusted to about 30° C. On the two electrodes 16 and 17 a voltage is then put, so that inside the electrophoresis strip a field intensity in general of about 20–70 volts/cm. prevails.

After the lapse of 190 minutes a sufficiently great separation has come about and the strip is removed after disconnection of the current, it then being dried and sprayed in the customary manner with a minhydrine reagent to render the components visible and is developed at 100° in the drying cabinet. The quantitative evaluation can at such juncture be made by direct photometering in the permeating light or according to some other process, for example elution.

The results of the operation are shown diagrammatically in Fig. 2 wherein one end of strip 1 has spaced apart the several components of the treated solution. At the start of the operation the solution is uniformly distributed in the strip of Fig. 2, the electrodes are applied to the opposite sides of the strip, causing migration of each of the components laterally, each component being illustrated by an individual series of closely spaced lines of Fig. 2.

*Example 2*

In Figs. 3a, 3b and 3c is illustrated a modified form of the invention wherein the strip is in vertical position and the separation of the components is continuous.

Frame 18 has arranged on the two longitudinal sides thereof grooves through which an electrolytic solution 19 is flushed, they being provided with electrodes. The electrolytic solution flows through vertical ducts 20, entering at the bottom 20' and flowing out at the top 20''. A filter paper cardboard 21 of 2–3 mm. thickness and a size of 45 x 50 cm. impregnated with electrolytic or buffer solution is arranged in such manner that the current contact is effected via a dialyzer membrane 22. Buffer or electrolytic solution flows through sheet 21 from top to bottom from a supply trough 23. A cool current of air of +5° C. is conducted over the front of the sheet. Behind the rear portion of the sheet 21 there is a filter paper cardboard 24 (of about the same size as that of the sheet 21), which absorbs water from below from a supply trough 25. A heating plate 27 is in contact with the face of cardboard 24 remote from sheet 21. The mixture of substances to be separated is fed at point 26 in continuous flow, for example by a measuring device. A current 21' of air or other gas is blown over the outer face of sheet 21, in a stream which is parallel to said sheet and preferably in an upward direction. A tension of 600 volts is applied to the electrodes, whereby a current of 100 ma. flows through the acetate buffer pH 4.9 of ion intensity 0.05. The field intensity to be employed is governed by the electrophoretic movability of the components to be separated, as well as by the velocity of flow through the filter paper cardboard. Heating plate 27 for the evaporation of liquid on sheet 24 has, for example, a temperature of 22° C. The mixture to be separated consists for example of decomposition peptides of a tryptic albumin decomposition (4 g./100 cm.³ solution). After the diffusion into separated zones the separated components drop out from the drop-out tips 28 into vessels (not shown). In this way within 24 hours 50 ccm. of the mixture, corresponding to 2 g. dry weight of the starting mixture could be separated into the individual components.

*Example 3*

Figure 4:
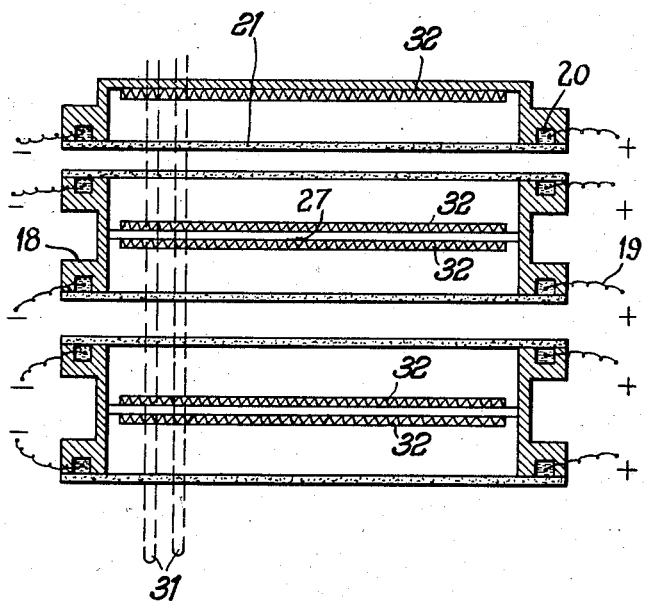
Fig. 4 is a view similar to Fig. 3a modified by the presence of a plurality of units.

The modification shown in Fig. 4 is similar to that of Fig. 3a, but utilizing a plurality of absorbent strips in the form of cardboard in parallel relationship in order to obtain increased efficiency of separation in a continuous manner. In accordance therewith porous cardboard sheets or strips 21 are arranged one behind the other on frames 18 at uniform intervals. Cool air may be blown in over the outer faces of sheets 21 and/or porous plates 32 may be heated by heaters 27. Plates 32 provide water for replacement on sheets 21. The solutions of the separated components which are discharged from tips 28 (Fig. 3b) are separately collected from all of the sections by suitable means, for example, in a series of Channels 31 (Fig. 4) transverse to the current and to strip 21, since the same conditions prevail throughout the entire unit.

What is claimed is:

1. A method of electrophoretic separation of constituents from a solution of a plurality of substances which comprises providing a porous sheet carrier impregnated with an electrolyte, introducing into said porous sheet said solution, impressing across said sheet an electric field, supporting said sheet so as to render the faces thereof unobstructed, cooling one side of said sheet and absorbing heat and vapors emanating therefrom, providing an absorbent layer containing a vaporizable solvent on the opposite side of and spaced from said sheet, heating said layer on the side thereof remote from said sheet to vaporize said solvent at a rate sufficient to replace the vapors emanating from said one side of said sheet, said layer being the sole source of said replacement solvent.

2. A method of separation according to claim 1 in which said cooling is by a refrigerant liquid in horizontal position below and substantially parallel to said sheet and said layer is above and substantially parallel to said sheet.

3. A method of separation according to claim 1 in which said cooling is by a stream of gas flowing across said one side of said sheet and in a direction substantially parallel thereto.

4. A method of separation according to claim 1 in which said sheet is substantially vertical and said solution is applied to the upper end of said sheet.

5. A method of separation according to claim 1 in which said sheet is substantially vertical and said solution is applied to the upper end of said sheet, said absorbent layer is substantially vertical, the lower end thereof dipping into a container of said solvent.

6. A method of separation according to claim 1 in which said sheet is substantially vertical and said solution is applied to the upper end of said sheet, and said cooling is by a stream of gas flowing upwardly along said one face of said sheet.

7. Apparatus for electrophoretic separation which comprises a flat porous sheet, a frame in which said sheet is mounted, containers for buffer solution on opposite sides of and connected to said sheet by a porous material, electrodes in said buffer solution to impress an electric field on said sheet, both faces of said sheet being unobstructed, cooling means on one side of said sheet and substantially parallel thereto, a porous layer substantially parallel to and spaced from said sheet and adapted to carry a solvent, heating means on the face of said layer remote from said sheet and adapted to vaporize said solvent at a rate sufficient to replace vapors emanating from said one side of said sheet, said sheet being out of contact with liquid.

8. Apparatus according to claim 7 in which said sheet, cooling means and porous layer are substantially horizontal.

9. Apparatus according to claim 8 in which a plurality of transverse threads support said sheet.

10. Apparatus according to claim 7 in which said cooling means and porous layer are substantially vertical.

11. Apparatus according to claim 7 in which said cooling means is a stream of upwardly flowing gas.

12. Apparatus according to claim 7 in which said heating means is substantially in contact with said porous layer.

13. Apparatus according to claim 10 in which said frame has a sheet on opposite sides thereof, and said heating means and porous layer are within said frame.

References Cited in the file of this patent

UNITED STATES PATENTS 2,768,948     McDonald et al.          Oct. 30, 1956

FOREIGN PATENTS 842,863     Germany               July 3, 1952
865,379     Germany               Feb. 2, 1953

OTHER REFERENCES

J. Clin. Path., 1955, 8, pages 144–149, art. by Franglen et al.

Science, vol. 120, July 2, 1954, page 6A.